United States Patent
Kobayashi

(10) Patent No.: US 7,405,749 B2
(45) Date of Patent: Jul. 29, 2008

(54) ELECTRONIC DEVICE AND ICON CHANGING METHOD

(75) Inventor: Takashi Kobayashi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 626 days.

(21) Appl. No.: 10/396,393

(22) Filed: Mar. 26, 2003

(65) Prior Publication Data
US 2003/0193601 A1 Oct. 16, 2003

(30) Foreign Application Priority Data
Apr. 15, 2002 (JP) ............... 2002-111909

(51) Int. Cl.
H04N 7/18 (2006.01)
H04N 5/225 (2006.01)
H04N 9/04 (2006.01)
H04N 5/76 (2006.01)
H04N 5/222 (2006.01)

(52) U.S. Cl. .............. 348/207.1; 348/207.99; 348/207.11; 348/153; 348/231.9; 348/333.01

(58) Field of Classification Search .......... 348/207.1, 348/207.11, 207.99, 231.9, 211.11, 211.3, 348/143, 153
See application file for complete search history.

(56) References Cited

U.S. PATENT DOCUMENTS

| | | | |
|---|---|---|---|
| 5,675,358 A * | 10/1997 | Bullock et al. ............. 345/420 |
| 5,877,765 A * | 3/1999 | Dickman et al. ............ 715/738 |
| 6,225,997 B1 * | 5/2001 | Mitsuoka et al. ............ 715/846 |
| 6,332,159 B1 * | 12/2001 | Hatae et al. ................. 709/224 |
| 6,342,894 B1 * | 1/2002 | Nojiri .......................... 345/531 |
| 6,362,841 B1 * | 3/2002 | Nykanen .................... 715/835 |
| 6,373,507 B1 * | 4/2002 | Camara et al. ............. 715/825 |
| 6,421,069 B1 * | 7/2002 | Ludtke et al. .............. 715/762 |
| 6,473,088 B1 * | 10/2002 | Matsumoto et al. ........ 345/530 |
| 6,580,458 B2 * | 6/2003 | Inagaki .................. 348/333.02 |
| 6,667,992 B1 * | 12/2003 | Yanagawa ................... 370/490 |
| 6,934,911 B2 * | 8/2005 | Salmimaa et al. .......... 715/744 |
| 6,947,075 B1 * | 9/2005 | Niikawa .................. 348/211.14 |
| 7,019,778 B1 * | 3/2006 | Prabhu et al. ........... 348/333.01 |
| 7,071,972 B2 * | 7/2006 | Koyama ................... 348/211.3 |
| 2003/0184647 A1 * | 10/2003 | Yonezawa et al. ........... 348/143 |

FOREIGN PATENT DOCUMENTS

| | | |
|---|---|---|
| JP | 11-17789 A | 1/1999 |
| JP | 11-146317 | 5/1999 |
| JP | 2001-092575 | 4/2001 |
| WO | WO 01/08150 A1 | 2/2001 |

* cited by examiner

*Primary Examiner*—David Ometz
*Assistant Examiner*—Richard M Bemben
(74) *Attorney, Agent, or Firm*—Fitzpatrick, Cella, Harper & Scinto

(57) ABSTRACT

An image capture device includes a first memory, a second memory and an icon changing unit. The first memory stores a plurality of icons. The second memory stores an icon representing the image capture device of which the second memory is a part. The icon is read by an external electronic device through an address space. The address space is accessed by the external electronic device though a serial bus. The icon changing unit changes the icon stored in the second memory to a selected icon that is selected from the plurality of icons stored in the first memory.

18 Claims, 7 Drawing Sheets

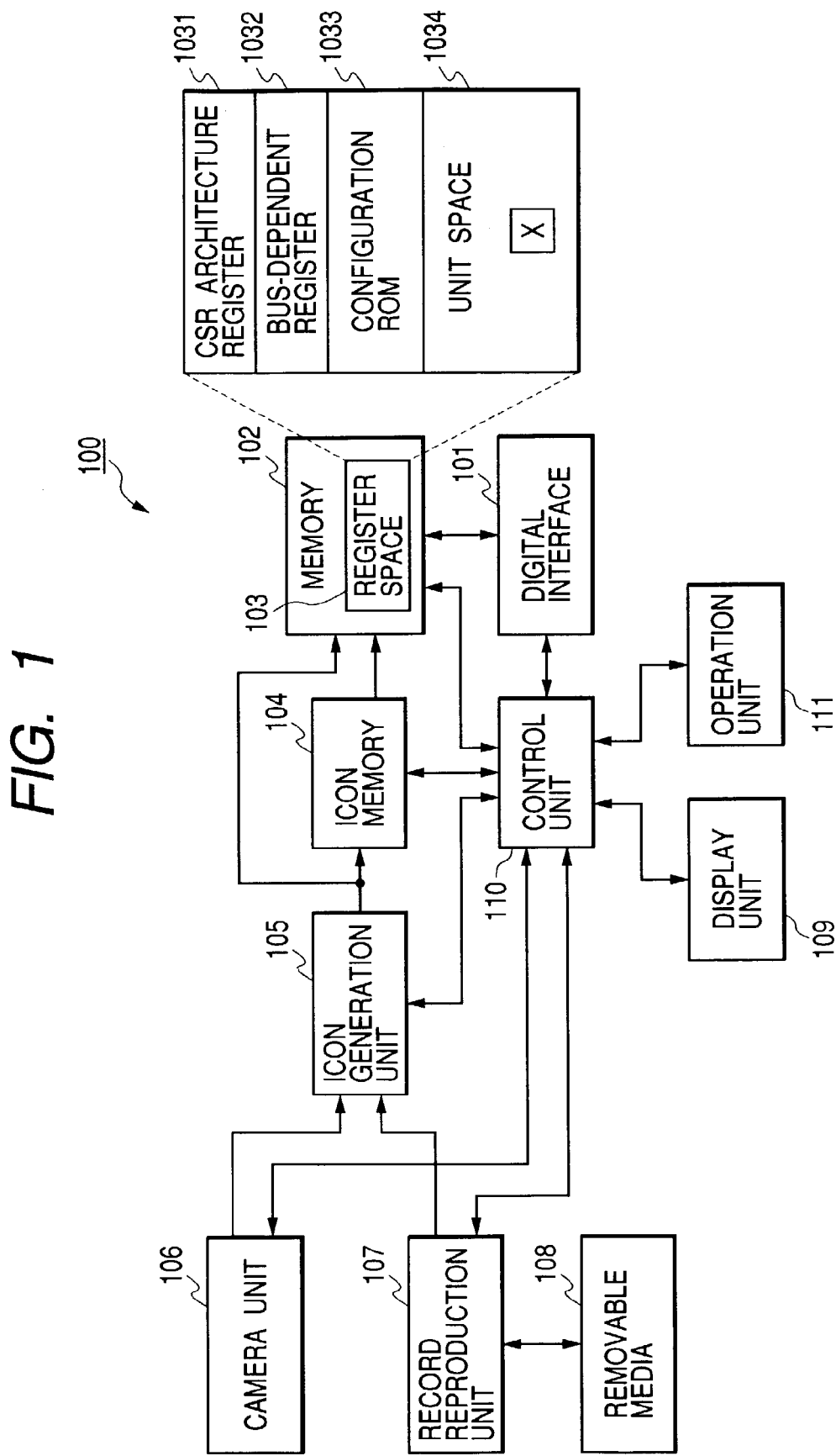

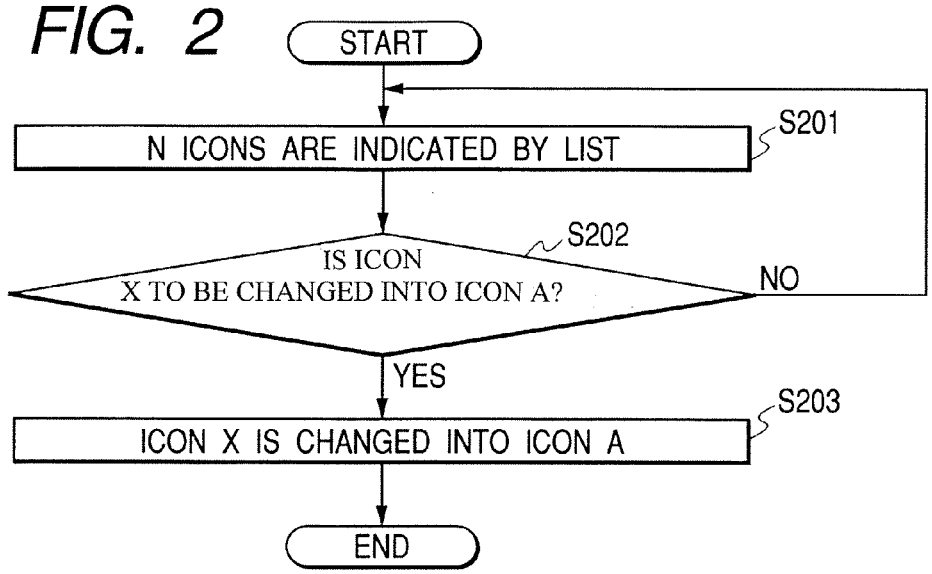
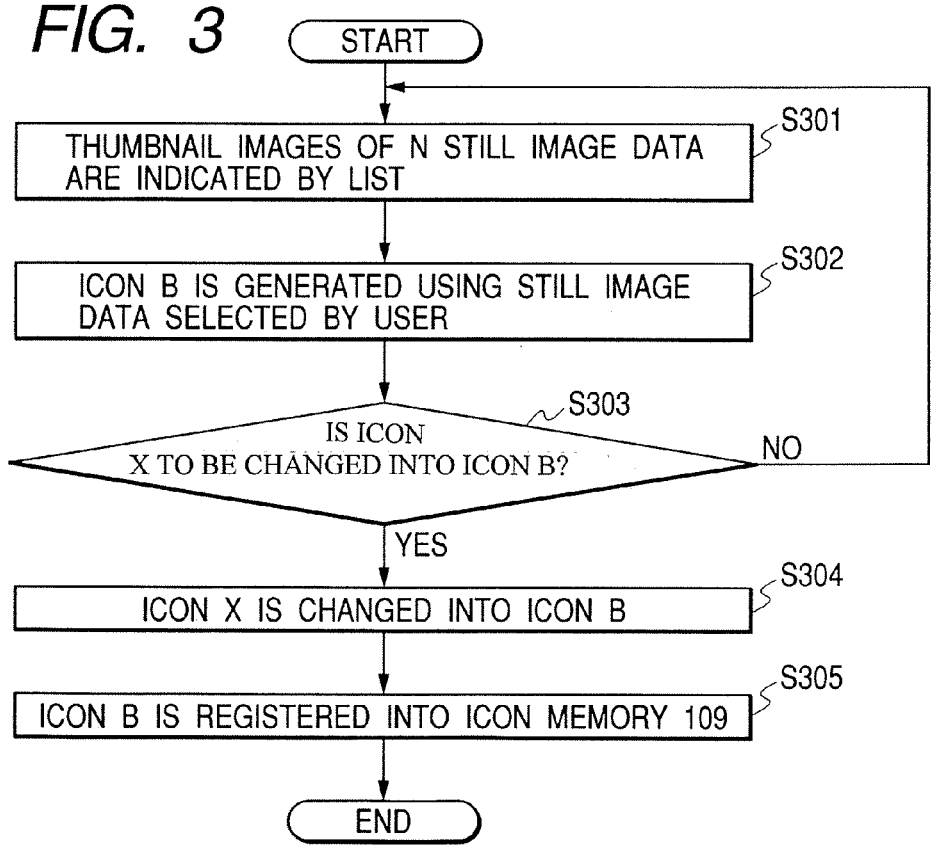

ELECTRONIC DEVICE AND ICON CHANGING METHOD

BACKGROUND OF THE INVENTION

1. Field of the Invention

The present invention relates to icons of electronic devices such as digital video cameras, digital cameras and the like.

2. Related Background Art

A remote control system for remotely controlling a conventional 1394 device 800 will be explained with reference to FIG. 8. The 1394 device 800 is an apparatus having a digital interface 801 conforming to IEEE Std 1394-1995, and a memory 802 for storing information within a register space 803 stipulated by ISO/IEC 13213:1994.

The register space 803 is divided into a CSR architecture register 8031, a bus-dependent register 8032, a configuration ROM 8033 and a unit space 8034. These areas can be accessed by other 1394 devices so long as the areas are not limited by the 1394 device 800. Further, the information existing in each area can be read out by other 1394 devices so long as the information is not limited by the 1394 device 800.

An icon X, which serves as an icon representing the 1394 device 800, is stored in a predetermined area of the unit space 8034. A controller 820 for remotely controlling the 1394 device 800 can read out the icon X from the unit space 8034 and display it as an icon representing the 1394 device 800.

However, in the conventional 1394 device 800, the icon X in the unit space 8034 cannot be changed to another icon. Thus, if the controller 820 displays icons of two 1394 devices 800, two icons having the same design are displayed, and, thus, a problem will occur in that it is hard for an observer to see the relationship between the icons and the respective 1394 devices.

SUMMARY OF THE INVENTION

An object of the present invention is to overcome the above-described drawbacks.

Another object of the present invention is to permit the user to change an icon representing an electronic device and held by the device to an icon selected by the user.

According to one preferred embodiment of the present invention, there is provided an electronic device having an address space which can be accessed by another electronic device, the electronic device comprising a first memory, storing icons, a second memory, storing an icon representing the electronic device and being provided from that electronic device to the external electronic device via the address space, and an icon changing unit which changes the icon stored in the second memory to a selected icon that is selected from the plurality of icons stored in the first memory.

According to another preferred embodiment of the present invention, there is provided an icon changing method for changing an icon in an electronic device having an address space which can be accessed by another electronic device, the method comprising the steps of selecting an icon from a plurality of icons stored in a first memory, and changing an icon stored in a second memory to the selected icon, the icon stored in the second memory representing the first electronic device and being provided from the first electronic device to the external electronic device via the address space.

According to a further preferred embodiment of the present invention, there is provided an electronic device having an address space which can be addressed by another electronic device, the electronic device comprising a memory which stores an icon representing the electronic device and being provided from that electronic device to the external electronic device via the address space, an icon generating unit which generates a new icon from still image data selected by a user, and an icon changing unit which changes the icon stored in the memory to the new icon.

According to a still further preferred embodiment of the present invention, there is provided an icon changing method for changing an icon in an electric device having an address space which can be accessed by another electronic device, the method comprising the steps of generating a new icon from still image data selected by a user, and changing an icon stored in a memory to the new icon, the stored icon in the memory representing the first electronic device and being provided from the first electronic device to the external electronic device via the address space.

According to a further preferred embodiment of the present invention, there is provided an electronic device having an address space which can be addressed by another electronic device, the electronic device comprising a memory which stores an icon representing the electronic device and being provided from that electronic device to the external electronic device via the address space, an icon generating unit which generates a new icon from still image data captured by the electronic device, and an icon changing unit which changes the icon stored in the memory to the new icon.

According to a still further preferred embodiment of the present invention, there is provided an icon changing method for changing an icon in an electric device having an address space which can be accessed by another electronic device, the method comprising the steps of generating a new icon from still image data captured by the first electronic device, and changing an icon stored in memory to the new icon, the icon stored in the memory representing the first electronic device and being provided from the first electronic device to the external electronic device via the address space.

The other objects, features and advantages of the present invention will become fully apparent from the following detailed description of the preferred embodiments.

BRIEF DESCRIPTION OF THE DRAWINGS

FIG. 1 is a view schematically showing a 1394 device according to a preferred embodiment of the present invention;

FIG. 2 is a flow chart showing a processing procedure of icon changing processing A;

FIG. 3 is a flow chart showing a processing procedure of icon changing processing B;

DESCRIPTION OF THE PREFERRED EMBODIMENTS

Figure 4:
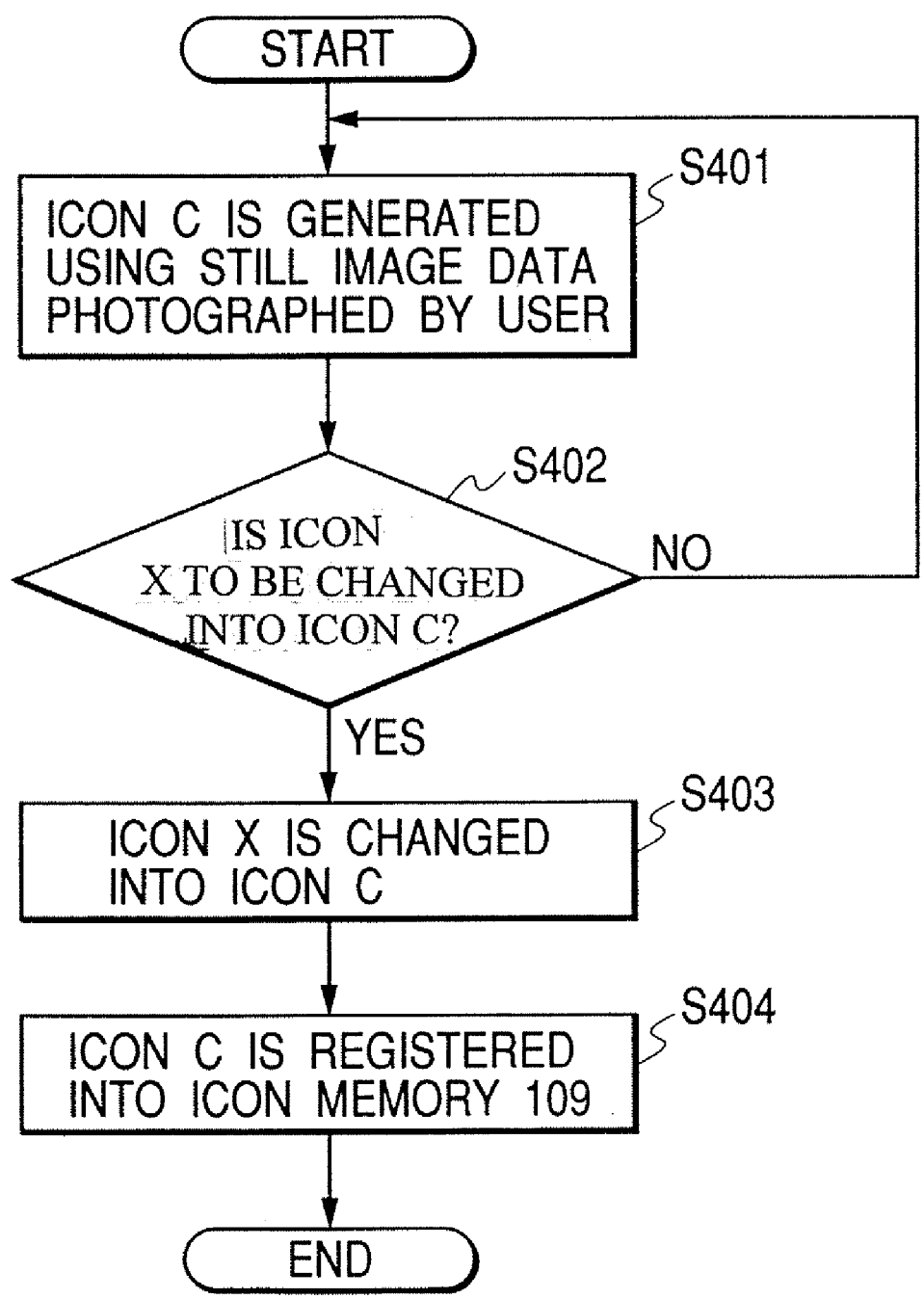
FIG. 4 is a flow chart showing a processing procedure of icon changing processing C.

The present invention will now be explained in connection with preferred embodiments thereof with reference to FIGS. 1 to 7.

First of all, a summary of a 1394 device 100 as an electronic device according to an embodiment of the present invention will be given with reference to FIG. 1. In this embodiment, while for the purpose of concreteness the 1394 device will be described as an image photo-taking apparatus such as a digital video camera, a digital camera or the like, the 1394 device may be another kind of device.

A digital interface 101 is a digital interface conforming to IEEE Std 1394-1995 and IEEE Std 1394a-2000. The IEEE Std 1394-1995 is a standard regarding a serial bus, while IEEE Std 1394a-2000 is an expansion standard of the IEEE Std 1394-1995.

A memory 102 is a memory for storing information within a register space 103 stipulated in ISO/IEC 13213:1994. The register space 103 is an address space assigned to the 1394 device 100 and is divided into a CRS architecture register 1031, a bus-independent register 1032, a configuration ROM 1033 and a unit space 1034. These areas can be accessed by other 1394 devices so long as the areas are not limited by the 1394 device 100. Further, the information existing in each area can be read out by other 1394 devices so long as the information is not limited by the 1394 device 100.

An icon X, to serve as an icon representing the 1394 device 100, is stored in a predetermined area of the unit space 1034. A controller for remotely controlling the 1394 device 100 can read out the icon X and display this icon as a representation of the 1394 device 100.

An icon memory 104 is a memory for storing a plurality of icons. An icon generation unit 105 serves to generate a new icon from still image data selected by the user or still image data photo-taken by the user.

A camera unit 106 serves to generate the still image data from an optical image of a photographic subject in accordance with a photo-taking instruction from the user. A record reproduction unit 107 has a function of recording the still image data generated by the camera unit 106 into removable media 108 and a function of reproducing still image data corresponding to a thumbnail image selected by the user from the removable media 108. The removable media 108 may be such types as a memory card or a photo-magnetic disk.

A display unit 109 has a function of displaying the still image data generated in the camera unit 106 and a function of displaying the thumbnail image or the still image data reproduced from the removable media 108.

A control unit 110 has a microcomputer and a memory. A control program for controlling various functions of the 1394 device 100 is stored in the memory of the control unit 110. A control program for controlling processing procedures shown in FIGS. 2, 3 and 4 is also stored in the memory of the control unit 110.

An operation unit 111 serves to inform the control unit 110 of the user's instruction. In the operation unit 111, an operation regarding photo-taking, an operation regarding reproduction, an operation for changing the icon representing the 1394 device 100 and held by the 1394 device 100 and the like can be performed. Further, in the operation unit 111, an operation for turning ON or OFF an icon changing mode A, an icon changing mode B or an icon changing mode C can also be performed.

Next, a processing procedure of icon changing processing which can be executed by the 1394 device 100 will be explained with reference to FIG. 2. Icon changing processing A is processing for changing the icon representing the 1394 device 100 and held by the 1394 device 100 to an icon selected from a plurality of icons in the icon memory 104. Incidentally, the icon changing processing A shown in FIG. 2 is processing executed when the icon changing mode A is turned ON.

Step S201: The control unit 110 reads out N (N is integral number equal to or greater than 1) icons stored in the icon memory 104 and indicates the read-out N icons on the display unit 109 by list.

Step S202: The control unit 110 inquires of the user whether or not the icon X in the memory space 1034 may be changed to an icon A as the icon selected by the user. If icon X is to be changed to icon A, the control unit 110 goes to step S203. On the other hand, if icon X is not to be changed to icon A, the control unit 110 is returned to step S201.

Figure 5:
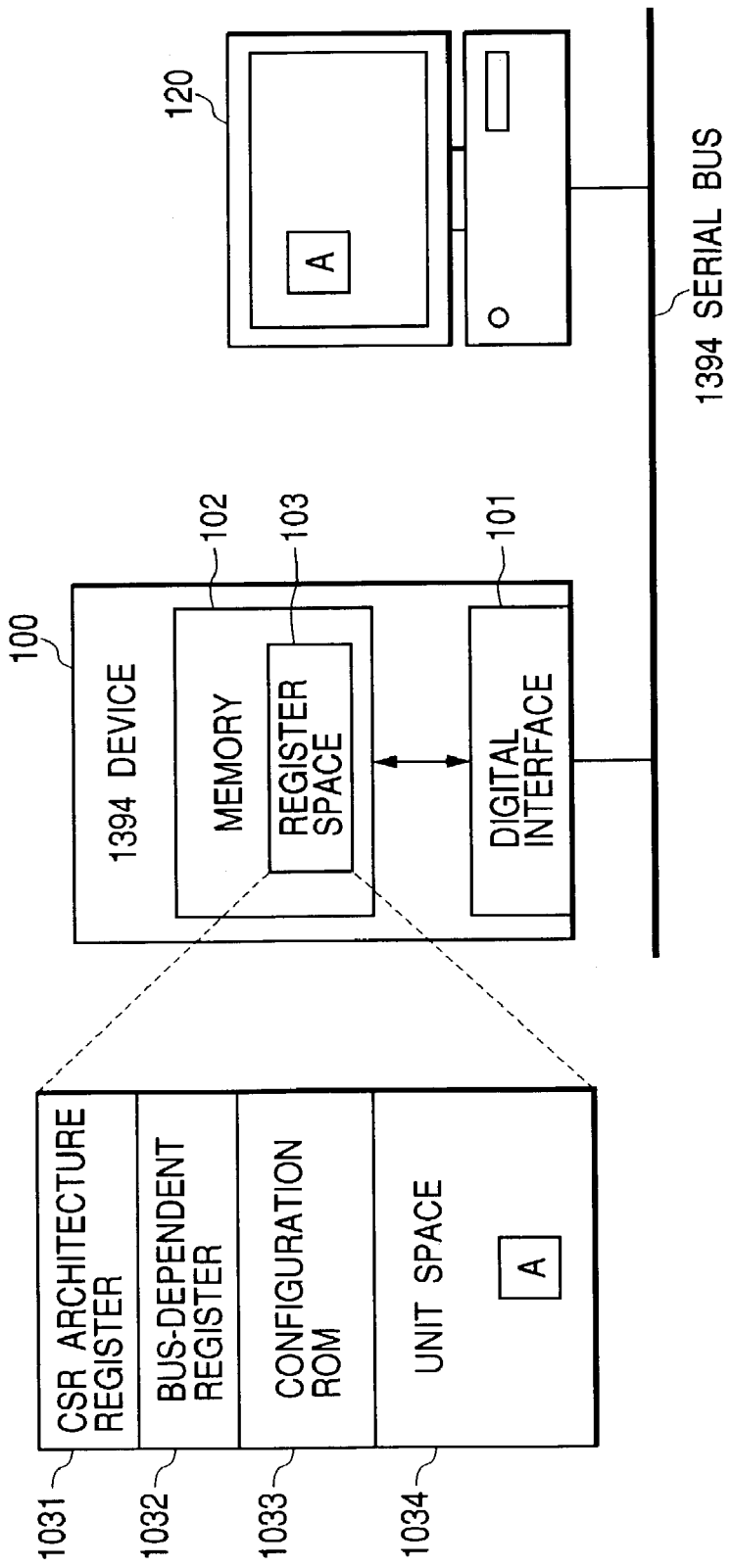
FIG. 5 is a view showing an example of a remote control system according to the embodiment of FIG. 1.

Step S203: The control unit 110 reads out icon A from the icon memory 104 and changes icon X in the unit space 1034 to an icon C. By such changing, the icon representing the 1394 device 100 becomes icon A, and, as shown in FIG. 5, icon A is displayed on the controller 120 for remotely controlling the 1394 device 100.

By the processing procedure shown in FIG. 2, since the 1394 device 100 can change the icon representing the 1394 device 100 to the icon selected by the user, visual distinction of the 1394 device 100 can be facilitated. As a result, the inconvenient difficulty in understanding the correspondence relationship between the icon and the 1394 device, can be mitigated or eliminated.

Next, a processing procedure of icon changing processing B which can be executed by the 1394 device 100 will be explained with reference to FIG. 3. Icon changing processing B is processing for changing the icon representing the 1394 device 100 and held by the 1394 device 100 to a new icon generated from still image data selected by the user. Incidentally, the icon changing processing B shown in FIG. 3 is processing executed when the icon changing mode B is turned ON.

Step S301: The record reproduction unit 107 reads out N (N is an integer equal to or greater than 1) thumbnail images of the still image data from the removable media 105. The control unit 110 indicates the N thumbnail images read out by the record reproduction unit 107 on the display unit 109 by list. The user manipulates the operation unit 111 to select a thumbnail image corresponding to desired still image data.

Step S302: The record reproduction unit 107 reads out still image data corresponding to the thumbnail image selected by the user from the removable media 105 and supplies the read-out still image data to the icon generation unit 105.

The icon generation unit 105 generates an icon B as a new icon from the still image data.

Step S303: The control unit 110 inquires of the user whether or not icon X in the memory space 1034 is to be changed to icon B. If icon X is to be changed to the icon B, the control unit 110 goes to step S304. On the other hand, if icon X is not being changed to icon B, the control unit 110 is returned to step S301.

Figure 6:
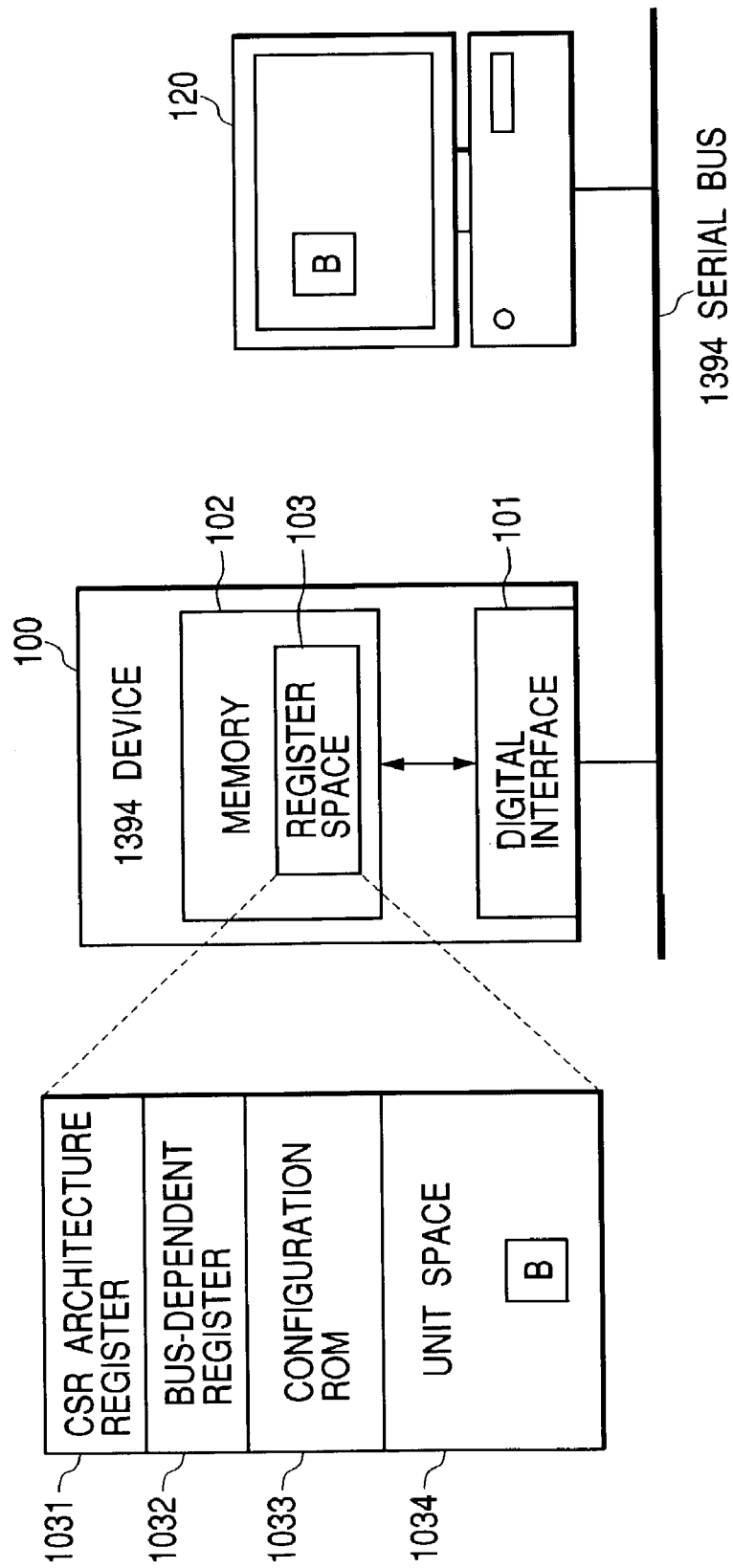
FIG. 6 is a view showing another example of a remote control system according to that embodiment.

Step S304: The control unit 110 changes the icon X in the memory space 1034 to icon B. As a result, the icon representing the 1394 device 100 becomes icon B, and, as shown in FIG. 6, icon B is displayed on the controller 120 for remotely controlling the 1394 device 100.

Step S305: The control unit 110 registers icon B generated by the icon generation unit 105 in the icon memory 104.

By the processing procedure shown in FIG. 3, since the 1394 device 100 can generate the new icon B from the still image data selected by the user and register the generated icon B in the icon memory 104, the number of distinguishable icons representing the 1394 device 100 can easily be increased. Further, at the same time when icon B is registered in the icon memory 104, the icon in the unit space 1034 can be changed to icon B.

Next, a processing procedure of icon changing processing C which can be executed by the 1394 device 100 will be explained with reference to FIG. 4. Icon changing processing C is processing for changing the icon representing the 1394 device 100 and held by the 1394 device 100 to a new icon generated from still image data photo-taken by the user. Incidentally, the icon changing processing C shown in FIG. 4 is processing to be executed when the icon changing mode C is turned ON.

Step S401: The user manipulates the operation unit 111 to photo-take a desired photographic subject. The camera unit 106 generates still image data of the photographic subject photo-taken by the user and supplies the generated still image data to the icon generation unit 105. The icon generation unit 105 generates an icon C as a new icon from the still image data generated in the camera unit 106.

Step S402: The control unit 110 inquires of the user whether or not the icon X in the memory space 1034 is to be changed to icon C. If icon X is to be changed to icon C, the control unit 110 goes to step S403. On the other hand, if icon X is not changed to icon C, the control unit 110 is returned to step S401.

Figure 7:
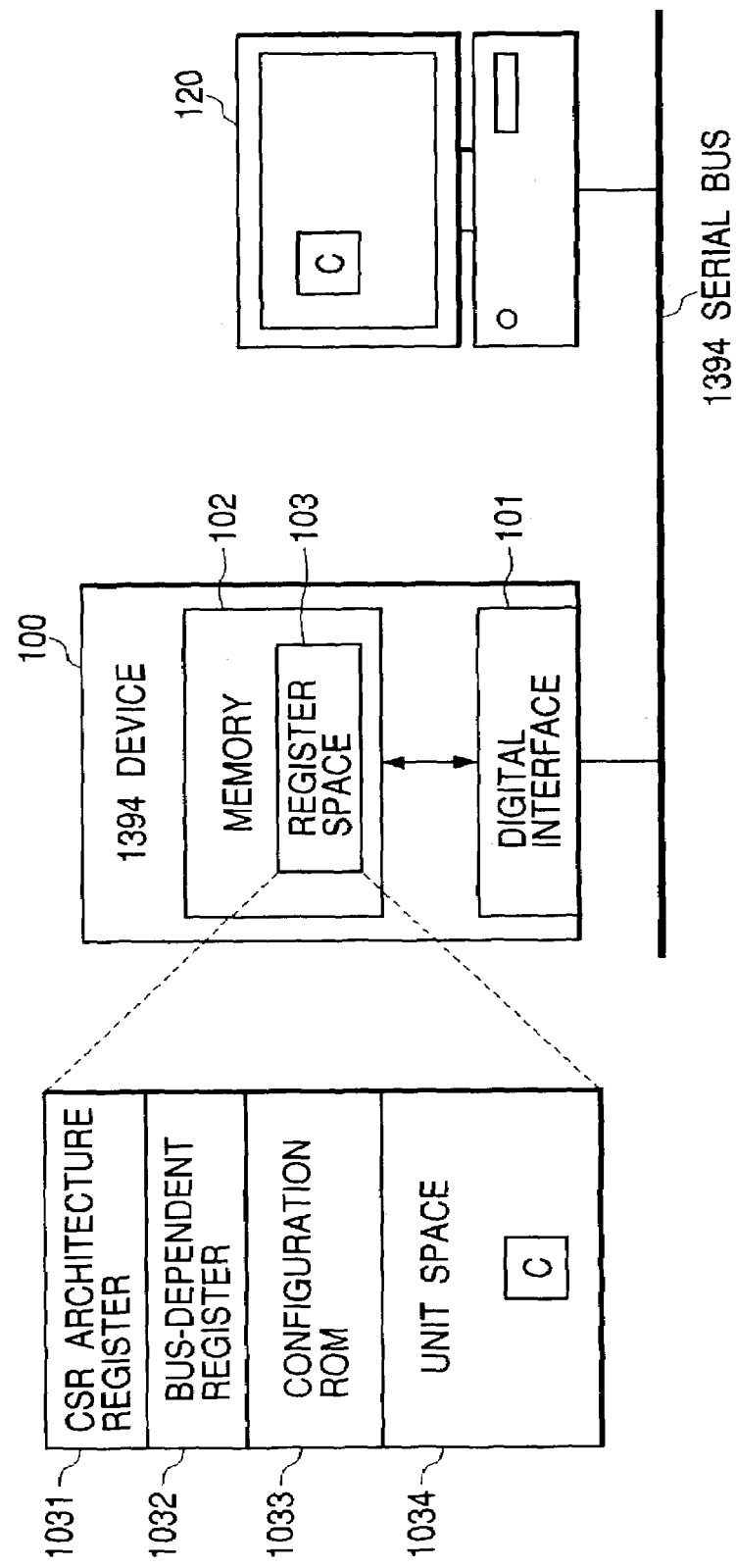
FIG. 7 is a view showing a further example of a remote control system according to that embodiment.

Step S403: The control unit 110 changes the icon X in the memory space 1034 to icon C. By such changing, the icon representing the 1394 device 100 becomes icon C, and, as shown in FIG. 7, icon C is displayed on the controller 120 for remotely controlling the 1394 device 100.

Step S404: The control unit 110 registers the icon C generated by the icon generation unit 105 in the icon memory 104.

By the processing procedure shown in FIG. 4, since the 1394 device 100 can generate the new icon C from the still image data photo-taken by the user and register the generated icon C in the icon memory 104, the number of distinguishable icons representing the 1394 device 100 can easily be increased.

Further, at the same time when icon C is registered in the icon memory 104, the icon in the unit space 1034 can be changed to icon C.

As mentioned above, according to the 1394 device 100 of the illustrated embodiment, since the icon representing the 1394 device 100 can be changed to an icon selected by the user, visual distinction of the 1394 device 100 in a display of icons can be facilitated, thus avoiding the difficulty and inconvenience of being unable to recognize the correspondence relationship between the icon and the 1394 device.

Further, according to the 1394 device 100 of the illustrated embodiment, since the new icon B can be generated from the still image data selected by the user and the generated icon B can be registered in the icon memory 104, the number of types of distinguishable icons representing the 1394 device 100 can easily be increased. Further, at the same time when icon B is registered in the icon memory 104, the icon in the unit space 1034 can be changed to icon B.

Further, according to the 1394 device 100 of the illustrated embodiment, since the new icon C can be generated from the still image data photo-taken by the user and the generated icon C can be registered in the icon memory 104, the number of kinds of icons representing the 1394 device 100 can easily be increased. Further, at the same time when icon C is registered in the icon memory 104, the icon in the unit space 1034 can be changed to icon C.

The above-described preferred embodiments are merely exemplary of the present invention, and are not to be construed to limit the scope of the present invention.

The scope of the present invention is defined by the scope of the appended claims, and is not limited to the specific descriptions in this specification. Furthermore, all modifications and changes belonging to equivalents of the claims are considered to fall within the scope of the present invention.

What is claimed is:

1. An image capture device comprising:
    a first memory which stores a plurality of icons;
    a second memory which stores an icon representing the image capture device of which said second memory is a part, the icon being read by an external electronic device through an address space, and the address space being accessed by the external electronic device though a serial bus; and
    an icon changing unit which changes the icon stored in said second memory to a selected icon that is selected from the plurality of icons stored in said first memory.

2. An image capture device according to claim 1, wherein the address space is a register space conforming with ISO/IEC 13213:1994.

3. A method for controlling an image capture device, said the method comprising the steps of:
    selecting an icon from a plurality of icons stored in a first memory; and
    changing an icon stored in a second memory to the selected icon, the icon stored in the second memory representing the image capture device and being read by an external electronic device through an address space, and the address space being accessed by the external electronic device though a serial bus.

4. A method according to claim 3, wherein the address space is a register space conforming with ISO/IEC 13213:1994.

5. An image capture device comprising:
    a memory which stores an icon representing the image capture device of which said memory is a part, the icon being read by an external electronic device through an address space, and the address space being accessed by the external electronic device through a serial bus;
    an icon generating unit which generates a new icon from still image data selected by a user; and
    an icon changing unit which changes the icon stored in said memory to the new icon.

6. An image capture device according to claim 5, wherein the address space is a register space conforming with ISO/IEC 13213:1994.

7. A method for controlling an image capture device, said method comprising the steps of:
    generating a new icon from still image data selected by a user; and
    changing an icon stored in a memory to the new icon, the icon stored in the memory representing the image capture device and being read by an external electronic device through an address space, and the address space being accessed by the external electronic device through a serial bus.

8. A method according to claim 7, wherein the address space is a register space conforming with ISO/IEC 13213:1994.

9. An image capture device comprising:
    a memory which stores an icon representing the image capture device of which said memory is a part, the icon being read by an external electronic device through an address space, and the address space being accessed by the external electronic device through a serial bus;
    an icon generating unit which generates a new icon from still image data captured by the image capture device; and an icon changing unit which changes the icon stored in said memory to the new icon.

10. An image capture device according to claim 9, wherein the address space is a register space conforming with ISO/IEC 13213:1994.

11. A method for controlling an image capture device, said method comprising the steps of:
generating a new icon from still image data captured by the image capture device; and
changing an icon stored in a memory to the new icon, the icon stored in the memory representing the image capture device and being read by an external electronic device through an address space, and the address space being accessed by the external electronic device thought a serial bus.

12. A method according to claim 11, wherein the address space is a register space conforming with ISO/IEC 13213:1994.

13. An image capture device according to claim 1, wherein the image capture device is one of a digital video camera and a digital camera.

14. A method according to claim 3, wherein the image capture device is one of a digital video camera and a digital camera.

15. An image capture device according to claim 5, wherein the image capture device is one of a digital video camera and a digital camera.

16. A method according to claim 7, wherein the image capture device is one of a digital video camera and a digital camera.

17. An image capture device according to claim 9, wherein the image capture device is one of a digital video camera and a digital camera.

18. A method according to claim 11, wherein the image capture device is one of a digital video camera and a digital camera.

* * * * *

UNITED STATES PATENT AND TRADEMARK OFFICE
CERTIFICATE OF CORRECTION

| | | |
|---|---|---|
| PATENT NO. | : 7,405,749 B2 | Page 1 of 1 |
| APPLICATION NO. | : 10/396393 | |
| DATED | : July 29, 2008 | |
| INVENTOR(S) | : Takashi Kobayashi | |

It is certified that error appears in the above-identified patent and that said Letters Patent is hereby corrected as shown below:

<u>COLUMN 1</u>

Figure 8:
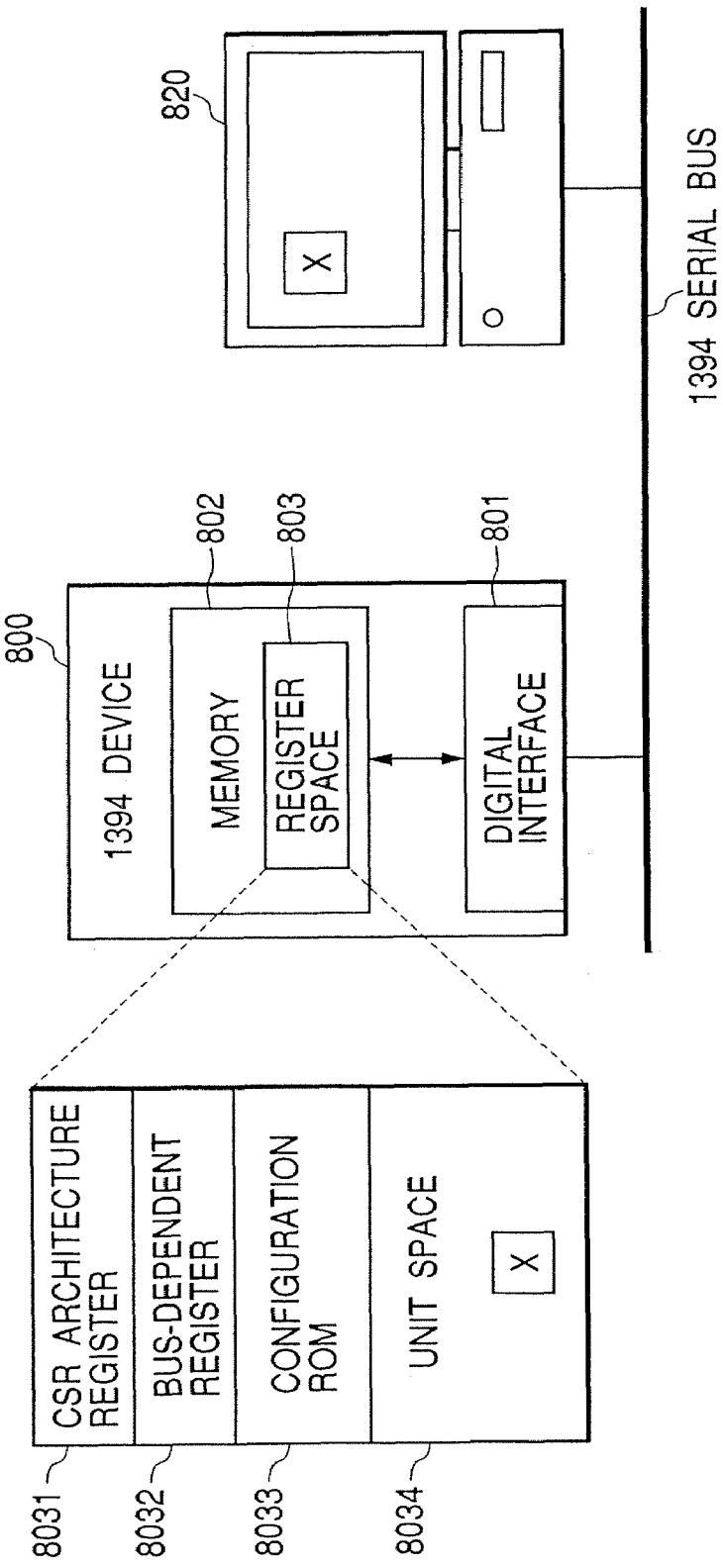
FIG. 8 is a view showing a conventional remote control system for remotely controlling a 1394 device.

Line 12, "FIG. 8. The" should read --FIG. 8. ¶ The--.

<u>COLUMN 6</u>

Line 11, "though" should read --through--; and
Line 28, "though" should read --through--.

<u>COLUMN 7</u>

Line 15, "thought" should read --through--.

Signed and Sealed this

Second Day of December, 2008

JON W. DUDAS
*Director of the United States Patent and Trademark Office*